United States Patent [19]

Yamashita et al.

[11] Patent Number: 6,106,952
[45] Date of Patent: Aug. 22, 2000

[54] THERMOPLASTIC POLYMER COMPOSITION

[75] Inventors: Takashi Yamashita; Katsunori Takamoto; Shigeru Kawahara; Haruhisa Masuda; Toru Kuki, all of Tsukuba, Japan

[73] Assignee: Kuraray Co., Ltd., Kurashiki, Japan

[21] Appl. No.: 09/261,231

[22] Filed: Mar. 3, 1999

[30] Foreign Application Priority Data

Mar. 12, 1998 [JP] Japan .................................. 10-080315
Nov. 18, 1998 [JP] Japan .................................. 10-344897

[51] Int. Cl.$^7$ .......................... B32B 15/06; C08K 5/01; C08L 53/02
[52] U.S. Cl. ...................... 428/425.8; 264/241; 264/478; 428/423.1; 428/461; 428/462; 428/521; 524/474; 524/505; 525/89; 525/90
[58] Field of Search ............................. 428/423.1, 425.8, 428/461, 462, 521; 264/241, 478; 524/474, 505; 525/89, 90

[56] References Cited

U.S. PATENT DOCUMENTS 4,107,131  8/1978  Gergen et al. ........................... 523/522

FOREIGN PATENT DOCUMENTS

| 0 332 339 | 9/1989 | European Pat. Off. . |
| 52-150464 | 12/1977 | Japan . |
| 56-115352 | 9/1981 | Japan . |
| 63-254156 | 10/1988 | Japan . |
| 6-107898 | 4/1994 | Japan . |
| 8-72204 | 3/1996 | Japan . |
| 8-319416 | 12/1996 | Japan . |
| 1 581 167 | 12/1980 | United Kingdom . |

*Primary Examiner*—D. S. Nakarani
*Attorney, Agent, or Firm*—Oblon, Spivak, McClelland, Maier & Neustadt, P.C.

[57] ABSTRACT

There is provided a thermoplastic polymer composition containing (i) 100 parts of a block copolymer comprising an aromatic vinyl block and a conjugated diene block, (ii) 5 to 200 parts of a polyurethane block copolymer having a thermoplastic polyurethane block, (iii) 10 to 300 parts of a thermoplastic polyurethane and (iv) 10 to 300 parts of a paraffin oil.

6 Claims, No Drawings

THERMOPLASTIC POLYMER COMPOSITION

BACKGROUND OF THE INVENTION

1. Field of the Invention

The present invention concerns a thermoplastic polymer composition excellent in melt adhesion, a laminate structure having a layer of the thermoplastic polymer composition and a layer comprising other material, as well as a manufacturing method thereof.

More in particular, the present invention relates to a thermoplastic polymer composition excellent in flexibility, elasticity, mechanical property, oil resistance and moldability, capable of adhering strongly under melting with various kind of materials, and capable of simply and smoothly manufacturing various laminate structures or composite articles having a layer of the thermoplastic polymer composition and a layer comprising such materials by melt adhesion, as well as a laminate structure having a layer of the thermoplastic polymer composition and a layer of other material, and a manufacturing method thereof.

2. Description of the Prior Art

Heretofore, products such as films, sheets, and molding products have been manufactured generally by using high molecular polymers, but use of a single polymer alone often results in poor moldability or cannot provide properties conforming the application uses, depending on the kind of the polymer, application use of products or purpose of use. In view of the above, it has been attempted to enhance the moldability or improve the mechanical property or chemical property of resultant products by using a polymer composition comprising two or more of polymers in a blend or in the form of laminates. However, when different kinds of polymers are blended into a polymer composition, combinations showing satisfactory compatibility are not present by so much purpose which cannot often be attained in view of inhomogenity caused by poor compatibility and interlayer separation.

Block copolymers comprising a styrene polymer block and a diene polymer block (hereinafter sometimes referred to as "styrene-diene block copolymer") and hydrogenation products thereof have rubber elasticity at a normal temperature and can be molded easily in a plasticated and molten state under heating, and are excellent in the balance between the flexibility and the mechanical property, so that they have been used generally in various fields as a sort of so-called thermoplastic elastomers in recent years.

As one of typical application uses of them, there can be mentioned a laminate structure (composite products) having a layer of a styrene-diene block copolymer and/or hydrogenation product thereof and a layer of a plastic and/or metal layer. A synthetic resins such as polyethylene, polypropylene, ethylene-vinyl acetate copolymer, ethylene-vinyl alcohol copolymer, polyvinyl chloride, polyvinylidene chloride, polystyrene, impact resistant polystyrene, ABS resin, polyethylene terephthalate, nylon and polycarbonate are used as the plastic layer in the laminate structure described above. Further, use of various metals such as stainless steel, iron, aluminum, copper, tin-plated or zinc galvanized steel has been attempted as the metal layer in the laminate structure.

In the laminate structures described above, the layer of the styrene-diene block copolymer and/or hydrogenation product thereof is flexible, gives good feeling upon contact and has properties such as excellent elasticity, vibration damping, sound damping, cushioning effect and rupture preventive function, while the layer of the synthetic resin or metal has a shape retaining function, reinforcing effect and fixing function. Therefore, the laminate structures have been noted in recent years as a high value-added products and the use of them has been attempted for various products as sheets, films and in the form of various molding products having complicate shapes, for example, as various kinds of parts for automobiles or vehicles such as instrument panels, center console boxes, door trims, pillars and assist grips; building materials such as doors and window frames, various switches or knobs in electric products and medical gypsum.

However, since the styrene-diene block copolymers and hydrogenation products thereof are less polar materials and, accordingly, they can be melt-adhered or integrally melt molded with identical kind of less polar plastics but their melt adhesion with highly polar plastics or metals is difficult. Therefore, in a case of compositing them by lamination with highly polar materials, there has been adopted a mechanical bonding method such as a method of providing an engaging portion (fitting portion) such as unevenness to a member (layer) comprising a styrene-diene block copolymer or a hydrogenation product thereof, and to a member (layer) comprising a plastic or metal and engaging (fitting) to join them or using another joining method, or a joining method using an adhesive.

However, since the method of providing the engagement such as unevenness makes the structure of a molding die for forming each of members complicate, it takes much time and labors for the manufacture of the die or increases the cost and, in addition, requires a complicate operation of engaging (fitting) both of the members.

The method of using the adhesive makes the step complicate in that both of the members are bonded by using the adhesive during or after the manufacture of both of the members. In addition, the adhesive used not always has high adhesion to both of the materials and results in a problem in view of adhesion failure, and the durability of adhesion strength and water resistance. Moreover, the organic solvent used for the adhesive gives a problem of worsening the working circumstance or ecological environment.

On the other hand, thermoplastic polyurethane elastomers having excellent abrasion resistance and oil resistance, rubber elasticity and melt moldability, have been used for various application uses including hoses, belts and tubes. However, since the thermoplastic polyurethane elastomers are poor in the hot water resistance and weather proofness, there range of application use is restricted at present.

Japanese Patent Unexamined Publication Sho 52-150464 and British Patent No. 1581167 describes a composition in which an engineering thermoplastic resin having predetermined properties is blended with a styrene-diene block copolymer and/or hydrogenation product thereof, and the publication discloses that the composition is suitable, particularly, to insulators for conductors and soldering wires and that thermoplastic polyurethane is used as a sort of the engineering thermoplastic resins described above. However, since the styrene-diene block copolymer and the thermoplastic polyurethane are poor in compatibility, properties of both of the polymers cannot be provided sufficiently, failing to obtain a useful polymer composition.

Further, various proposals have been made so far for the techniques with an aim of improving the melt-processability of the styrene-diene block copolymer or a hydrogenation product thereof, and a melt-processable composition comprising a styrene-diene block copolymer or a hydrogenation product thereof blended with a thermoplastic urethane elastomer has been known as such a prior art (Japanese Patent Unexamined Publication Hei 6-107898, U.S. Pat. No. 5,472,782 and Japanese Patent Unexamined Publication Hei 8-72204). However, use of the melt-processable composition sometimes results in a problem of failing to obtain a sufficient bonding strength or the lack of the durability of the adhesion strength depending on the kind of the material laminated therewith. Moreover, compatibility (melt dispersibility) between the styrene-diene copolymer or hydrogenation product thereof and the polyurethane thermoplastic elastomer in the melt-processable composition is not quite satisfactory, so that the composition shows no good mechanical properties and results in a problem such as delamination or unstability of adhesion strength in the lamination molded products obtained, for example, by composite layer injection molding.

Modification of a styrene-diene block copolymer with an unsaturated carboxylic acid or a derivative thereof and blending with a thermoplastic polyurethane elastomer has been proposed with an aim of improving the compatibility between the styrene-diene block copolymer and the thermoplastic polyurethane elastomer has been proposed (Japanese Patent Unexamined Publication Sho 63-254156). However, the thus obtained polymer composition involves a problem in view of the moldability and, in addition, the kind of the materials to melt adhesion therewith is restricted, shows no melt adhesion with various materials and has a drawback that the surface roughness is large for the molding products obtained from the polymer composition.

Further, it has been also known to add a styrene-diene block polymer modified with an unsaturated dicarboxylic acid or a derivative thereof as a compatibilizing agent to a polymer composition comprising a styrene-diene copolymer and a thermoplastic polyurethane elastomer (Japanese Patent Unexamined Publication Sho 56-115352 and U.S. Pat. No. 4,429,076). However, it cannot be said that sufficient improving effect can be obtained also in this case like that the cases described previously.

SUMMARY OF THE INVENTION

An object of the present invention is to provide a thermoplastic polymer composition capable of adhering strongly and easily under melting with various materials by improving the compatibility between a block copolymer having a polymer block mainly comprising an aromatic vinyl compound and a polymer block mainly comprising a conjugated diene compound and/or hydrogenation product thereof such as a styrene-diene block copolymer or hydrogenation product thereof, and a thermoplastic urethane elastomer, without deteriorating various properties such as excellent elasticity, flexibility, mechanical property, oil resistance and moldability inherent to the block copolymer and/or hydrogenation product thereof.

Another object of the present invention is to provide a laminate structure (composite product) in which a layer of the thermoplastic polymer composition and a layer of other material are fused and adhered.

The present inventors have made various studies for attaining the foregoing objects. As a result, it has been found that an elastic thermoplastic polymer composition capable of strongly adhering under melting with various materials, particularly, synthetic resins or metals having polarity can be obtained by blending, a thermoplastic elastic polymer comprising a block copolymer having a polymer block mainly composed of an aromatic vinyl compound and a polymer block mainly composed of a conjugated diene compound and/or a hydrogenation product thereof: with (i) a polyurethane block copolymer having an addition polymer block comprising a block copolymer having a polymer block mainly composed of an aromatic vinyl compound and a polymer block mainly composed of a conjugated diene compound or a hydrogenation product thereof, and a thermoplastic polyurethane elastomer block;

(ii) a thermoplastic polyurethane elastomer and (iii) a paraffin oil, each at a specific ratio, whereby the polyurethan block copolymer (i) effectively acts as a compatibilizing agent between the thermoplastic elastic polymer and the thermoplastic polyurethane elastomer (ii).

Namely, the present invention provides a thermoplastic polymer composition comprising;

(1) 100 parts by weight of at least one addition polymerized block copolymer selected from a block copolymer having a polymer block (A1) mainly composed of an aromatic vinyl compound and a polymer block mainly composed of a conjugated diene compound, and a hydrogenation product thereof (B1), and based thereon (2) 5 to 200 parts by weight of a polyurethane block copolymer (II) having an addition polymerized block (C) comprising a block copolymer having a polymer block (A2) mainly composed of an aromatic vinyl compound and a copolymer block mainly composed of a conjugated diene compound or a hydrogenation product thereof (B2), and a thermoplastic polyurethane elastomer block (D);

(3) 10 to 30 parts by weight of a thermoplastic polyurethane elastomer (III), and (4) 10 to 300 parts by weight of a paraffin oil (IV), each at the ratio described above.

Further, the present invention provides a laminate structure having a layer or layers comprising the thermoplastic polymer composition and a layer or layers comprising other material.

Further, the present invention also provides a method of manufacturing the laminate by lamination molding under melting a thermoplastic polymer composition with other material.

DETAILED DESCRIPTION OF THE PREFERRED EMBODIMENTS

The present invention will be explained specifically.

The addition polymerized block copolymer (I) to be used in the thermoplastic polymer composition of the present invention comprises at least one member selected from a block copolymer having a polymer block (A1) mainly composed of an aromatic vinyl compound [hereinafter simply referred to as "aromatic vinyl polymer block (A1)"], a polymer block (B1) mainly composed of a conjugated diene compound, and a hydrogenation product thereof as described above [hereinafter referred to as "conjugated diene polymer block (B1)"].

The polyurethane block copolymer (II) to be used in the thermoplastic polymer composition of the present invention comprises a polyurethane block copolymer having an addition polymerized block (C) comprising a block copolymer having a polymer block (A2) mainly composed of an aromatic vinyl compound [hereinafter referred to as "aromatic vinyl polymer block (A2)"] and a polymer block (B2) mainly composed of a conjugated diene compound or a hydrogenation product thereof [hereinafter referred to as "conjugated polymer block (B2)"] and a thermoplastic polyurethane elastomer block (D), as described above.

The aromatic vinyl compound constituting the aromatic vinyl polymer block (A1) in the addition polymerized block copolymer (I) and the aromatic vinyl compound constituting the aromatic vinyl polymer block (A2) in the addition polymerized block (C) of the polyurethane block copolymer (II) can include, for example, vinyl aromatic compounds, such as styrene, α-methylstyrene, β-methylstyrene, o-, m-, p-methylstyrene, t-butylstyrene, 2,4-dimethylstyrene, 2,4,6-trimethylstyrene, monofluorostyrene, difluorostyrene, monochlorostyrene, dichlorostyrene, methoxystyrene, vinylnaphthalene, vinylanthracene, indene, acetonaphthylene.

The aromatic vinyl copolymer blocks (A1) and (A2) may have a structural unit comprising only one aromatic vinyl compound or may have a structural unit comprising two or more compounds. Among them, it is preferred that the aromatic vinyl polymer blocks (A1) and (A2) mainly comprise structural units derived from styrene.

The aromatic vinyl polymer blocks (A1) and (A2) may optionally have a slight amount of structural units comprising other copolymerizable monomers in addition to the structural units comprising aromatic vinyl compounds, and a ratio of the structural units comprising other copolymerizable monomers in this case is preferably 30% by weight or less, and, more preferably, 10% by weight or less based on the weight of the aromatic vinyl polymer block (A1) or (A2).

The other copolymerizable monomers in this case can include ionically polymerizable monomers, for example, 1-butene, pentene, hexene, butadiene, isoprene and methylvinyl ether.

The conjugated diene compound constituting the conjugated polymer block (B1) in the addition polymerized block copolymer (I) and the conjugated diene polymer block (B2) in the addition polymerized block (C) of the polyurethane block copolymer (II) can include, for example, isoprene, butadiene, hexadiene, 2,3-dimethyl-1,3-butadiene, and 1,3-pentadiene. The conjugated diene polymer blocks (B1) and (B2) may comprise one or more of such conjugated diene compounds. When the conjugated diene polymer block (B1) and/or (B2) have a constitutional unit derived from two or more conjugated diene compounds, they may be in a random, tapered, partially block form or combination of two or more of the forms.

Among them, the conjugated diene polymer block (B1) and/or (B2) may preferably be in the form of a hydrogenated polyisoprene block in which a polyisoprene block comprising monomer units mainly composed of iroprene units or unsaturated bonds thereof are partially or entirely hydrogenated; a hydrogenated polybutadiene block in which a polybutadiene block comprising monomer units mainly composed of butadiene units or unsaturated bonds thereof are partially or entirely hydrogenated, or a hydrogenated isoprene/butadiene block in which an isoprene/butadiene copolymer block comprising monomer units mainly composed of iroprene units and butadiene units or unsaturated bonds thereof are partially or entirely hydrogenated, in view of effects of improvement of the rubber property. In particular, the conjugated diene polymer blocks (B1) and/or (B2) are preferably the polyisoprene block, isoprene/butadiene copolymer block or hydrogenated block thereof.

In the above-mentioned polyisoprene block which can be the constitutional block of the conjugated diene polymer block (B1) and/or (B2), the units derived from iroprene comprise, before the hydrogenation, at least one group selected from the group consisting of 2-methyl-2-butene-1,4-diyl group [—$CH_2$—$C(CH_3)$=CH—$CH_2$—; 1,4-bond isoprene unit], isopropenylethylene group [—CH($C(CH_3)$=$CH_2$)—$CH_2$—; 3,4-bond isoprene unit] and 1-methyl-1-vinylethylene group [—$C(CH_3)$(CH=$CH_2$)—$CH_2$—; 1,2-bond isoprene unit], and the ratio of each unit is not particularly limited.

In the polybutadiene block which can be a constitutional block of the conjugated polymer block (B1) and/or (B2), it is preferred that from 70 to 20 mol %, particularly, from 65 to 40 mol % of the butadiene units comprise 2-butene-1,4-diyl group (—$CH_2$—CH=CH—$CH_2$—; 1,4-bond butadiene unit), and from 30 to 80 mol %, particularly, from 35 to 60 mol % of the blocks comprise vinyl ethylene groups [—CH(CH=$CH_2$)—$CH_2$—; 1,2-bond butadiene unit] before the hydrogenation. When the amount of the 1,4-bonds in the polybutadiene block is out of the range of from 70 to 20 mol % described above, the rubber property sometimes become insufficient.

In the isoprene/butadiene copolymer block which can be the constitutional block of the conjugated diene polymer block (B1) and/or (B2), the unit derived from iroprene comprises at least one group selected from the group consisting of 2-methyl-2-butene-1,4-diyl group, isopropenylethylene group and 1-methyl-1-vinylethyene group and a unit derived from butadiene comprises 2-butene-1,4-diyl group and/or a vinyl ethylene group before the hydrogenation, and the ratio of each unit is not particularly restricted. The arraignment of isoprene units and butadiene units in the isoprene/butadiene copolymer block may be a random, block or taper block form. The molar ratio of the isoprene units:butadiene units is, preferably, from 1:9 to 9:1, more preferably, from 3:7 to 7:3 in view of the effect of improving, rubber property.

In the addition polymerized block copolymer (I) and the polyurethane block copolymer (II), unsaturated double bonds in the conjugated diene polymer blocks (B1) and (B2) are preferably hydrogenated partially or entirely (hereinafter simply referred to as "hydrogenated"). In this case, the hydrogenation rate of the conjugated diene polymer blocks (B1) and (B2) is preferably 50 mol % or more and, more preferably, 60 mol % or more and, further preferably, 80 mol % or more.

The bonding form of the aromatic vinyl polymer block (A1) and the conjugated diene polymer block (B1) in the addition polymerized block copolymer (I) and the bonding form of the aromatic vinyl polymer block (A2) and the conjugated diene polymer block (B2) in the addition polymerized block (C) of the polyurethane block copolymer (II) are not particularly limited, but may be any of linear, branched and radial form, and may be a combination of two or more of the forms with the linear bonding form being preferred.

When the addition polymerized block copolymer (I) and/or the addition polymerized block (C) of the polyurethane block copolymer (II) have a structure that the aromatic vinyl polymer block and the conjugated diene polymer block are bonded linearly, the bonding form may be a diblock structure represented by A—B, a triblock structure represented by A—B—A or B—A—B, a tetrablock structure represented by A—B—A—B or B—A—B A or a polyblock structure in which 5 number or more of A and B are bonded linearly assuming that the aromatic vinyl polymer blocks (A1) and (A2) are represented by A and the conjugated polymer blocks (B1) and (B2) are represented by B. Among them, the diblock structure represented by A—B or the triblock structure represented by A—B—A are preferred in view of elasticity, mechanical properties, melt adhesion and handling.

In the polyblock structure of tri- or higher block, two or more aromatic vinyl polymer blocks A may be identical with or different from each other, and two more conjugated diene polymer blocks B may be identical with or different from each other. For example, referring to two aromatic vinyl polymer blocks A in the triblock structure represented by A—B—A or two conjugated diene polymer blocks B in the triblock structure represented by B—A—B, the kind, bonding form and the number average molecular weight of the aromatic vinyl compound or the conjugated diene compound may be identical with or different from each other.

In the addition polymerized block, copolymer (I) and the addition polymerized block (C) of the polyurethane block copolymer (II), the weight ratio of [aromatic vinyl polymer block (A1) or (A2)]:[conjugated diene polymer block (B1) or (B2)] is preferably from 1:9 to 9:1, more preferably from 2:8 to 8:2 in that the heat resistance of the thermoplastic polymer composition and molding products or laminate structures obtained therefrom become satisfactory and the effect of improving the rubber property is improved.

In addition, in the addition polymerized block copolymer (I) and the addition polymerized block (C) of the polyurethane block copolymer (II), the molecular weights of the aromatic vinyl polymer block (A1) and (A2) and of the conjugated diene polymer block (B1) and (B2) are not particularly limited, but the number average molecular weight of the aromatic vinyl polymer block (A1) and (A2) preferably ranges from 2,500 to 75,000, and the number average molecular weight of the conjugated diene polymer block (B1) and (B2) preferably ranges from 10,000 to 150,000 before the hydrogenation since the rubber property of the thermoplastic polymer composition are made excellent.

The number average molecular weight for the addition polymerized block copolymer (I) and the number average molecular weight of the addition polymerized block (C) in the polyurethane block copolymer (II) are preferably within a range of from 15,000 to 300,000 in view of the mechanical property and moldability.

The number average molecular weight referred to in the specification of the present invention is a value obtained from a standard polystyrene calibration curve by gel permeation chromatography (GPC method).

The addition polymerized block copolymer (I) to be used in the thermoplastic polymer composition of the present invention has the block structure described above and generally has no functional groups such as hydroxy groups at the terminals of the molecule.

The polyurethane block copolymer (II) to be used in the thermoplastic polymer composition of the present invention is a polyurethane block copolymer in which the addition polymerized block (C) having the above-mentioned block structure and the thermoplastic polyurethane elastomer block (D) are bonded.

The thermoplastic polyurethane elastomer block (D) in the polyurethane block copolymer (II) may be any block so long as it comprises a thermoplastic polyurethane elastomer, but it preferably comprises a thermoplastic polyurethane elastomer identical or similar with the thermoplastic polyurethane elastomer (III) to be described later since the compatibility of the polymers in the thermoplastic polymer composition is improved and the mechanical property of the thermoplastic polymer composition and a molded product or a laminate structure obtained therefrom are excellent.

The thermoplastic polyurethane elastomer block (D) in the polyurethane block copolymer (II) preferably has a number average molecular weight of from 200 to 150,000 and, more preferably, from 500 to 50,000 since the rubber property of the thermoplastic polymer composition is further improved.

The polyurethane block copolymer (II) may be a diblock copolymer having one addition polymerized block (C) and one thermoplastic polyurethane elastomer block (D), or may be a polyblock copolymer in which three or more in total of the addition polymerized block (C) and the thermoplastic polyurethane elastomer block (D) are bonded, but a diblock copolymer in which one addition polymerized block (C) and one thermoplastic polyurethane elastomer block (D) are bonded is preferred in view of the compatibility, mechanical property and moldability of the obtained thermoplastic polymer composition.

The manufacturing method of the addition polymerized block copolymer (I) and the polyurethane block copolymer (II) is not particularly limited, but they can be manufactured by any method so long as it is a method capable of manufacturing each block copolymer having the above-mentioned structure, and products already put on the market can also be used.

The manufacturing method is not particularly limited, but the addition polymerized block copolymer (I) can be manufactured, for example, by an ion polymerization method such as anionic or cationic polymerization, a single site polymerization method or radial polymerization method.

The anion polymerization method comprises successively polymerizing aromatic vinyl compounds and conjugated diene compounds in an inert organic solvent such as n-hexane and cyclohexane by using a polymerization initiator such as an alkyl lithium compound to form a block copolymer having a desired molecular structure and molecular weight, and then adding an active hydrogen compound such as alcohols, carboxylic acids or water to terminate the polymerization.

Then, the block copolymer formed as described above is preferably hydrogenated in the presence of a hydrogenating catalyst in an inert organic solvent according to a known method to obtain a hydrogenated addition polymerized block copolymer (I).

A polyurethane block copolymer (II) can be obtained, with no particular restriction, by kneading, for example, a thermoplastic polyurethane elastomer and an addition polymerized block copolymer having an aromatic vinyl polymer block (A2) and a conjugated diene polymer block (B2) and having a functional group, preferably, hydroxy groups, at the terminal and/or a hydrogenated product thereof (hereinafter simply referred to as "terminal-modified addition polymerized block copolymer") under a melting condition to react them to form a polyurethane reaction product, and extracting/recovering the same to obtain a polyurethane block copolymer (II).

In this case, the thermoplastic polyurethane elastomer and the terminal-modified addition polymerized block copolymer can be melt-kneaded by using melt-kneading devices such as single screw extruders, twin screw extruders, kneaders or banbury mixers. The condition for the melt-kneading can be selected depending on the kinds of the thermoplastic polyurethane elastomers and the terminal-modified addition polymerized block copolymers to be used, and the type of the device, but the melt-kneading is generally conducted at the temperature range from 180 to 250° C. for about 1 to 15 min.

In addition to the method described above, the polyurethane block copolymer (II) can also be obtained, for example, by adding a terminal-modified addition polymerized block copolymer at the start or in the course of the reaction of preparing the thermoplastic polyurethane elastomer by reacting a high molecular diol, an organic diisocyanate and a chain extender in an extruder to form a polyurethane reaction product containing the polyurethane block copolymer (II), and extracting/recovering the polyurethane block copolymer (II) from the polyurethane reaction product.

In the foregoings, the polyurethane block copolymer (II) can be extracted and recovered from the polyurethane reaction product, for example, by optionally pulverizing the polyurethane reaction product to an appropriate size, and processing it with a good solvent to polyurethane such as dimethyl formamide to extract/remove unreacted thermoplastic polyurethane elastomer, and then processing it with a good solvent to the terminal-modified addition polymerized block copolymer such as cyclohexane to extract/remove the unreacted terminal modified addition polymerized block copolymer and drying the remaining solid materials.

The terminal-modified addition polymerized block copolymer to be used for the manufacture of the polyurethane block copolymer (II) is often incorporated with an addition polymerized block copolymer having no functional group on the terminal and/or a hydrogenated product thereof, that is, a polymer corresponding to the addition polymerized block copolymer (I).

Therefore, the polyurethane reaction product obtained by the reaction of the thermoplastic polyurethane elastomer and the terminal-modified addition polymerized block copolymer is often a mixture of four components, namely, the polyurethane block copolymer (II), the unreacted thermoplastic polyurethane elastomer, the addition polymerized block copolymer (I) and the terminal-modified addition polymerized block copolymer.

Therefore, the thermoplastic polymer composition of the present invention may be prepared by using a method of adding the terminal-modified addition polymerized block copolymer together with the addition polymerized block copolymer (I), the polyurethane block copolymer (II), the thermoplastic polyurethane elastomer (III) and the paraffin oil (IV) to react the terminal-modified addition polymerized block copolymer with the thermoplastic polyurethane elastomer (II) in the composition thereby forming a polyurethane reaction product, and allowing the polyurethane reaction product to be present in the composition as it is [namely, a method of allowing the polyurethane block copolymer (II) to be present as it is in the form of a reaction product without recovering it from the polyurethane reaction product].

In this case, the terminal-modified addition polymerized block copolymer to be used in the manufactured of the polyurethane block copolymer (II) can be prepared, for example, by the following anionic polymerization method. Namely, the block copolymer can be prepared by the method comprising successively polymerizing an aromatic vinyl compound and a conjugated diene compound in an inert organic solvent such as n-hexane and cyclohexane using an alkyl lithium compound as an initiator, adding a compound having an oxirane skeleton such as ethylene oxide, propylene oxide or styrene oxide or a lactone compound such as ε-caprolactone, β-propiolacton or dimethyl propiolactone (pivalolactone) when the desired molecular structure and the molecular weight are obtained and then adding an active hydrogen-containing compound such as alcohols, carboxylic acids and water to terminate the polymerization. Then, the obtained block copolymer is preferably hydrogenated in an inert organic solvent such as n-hexane, cyclohexane in the presence of a hydrogenation catalyst such as a Ziegler catalyst including cobalt and nickel under the conditions at a reaction temperature of from 20 to 150° C., and at a hydrogen pressure of from 1 to 150 kg/cm$^2$ to obtain a hydrogenated terminal-modified addition polymerized block copolymer.

When the terminal-modified addition polymerized block copolymer has a linear chain structure, it may have one hydroxyl group on one terminal of the molecule or may have two hydroxyl groups on both terminals of the molecule. On the other hand, when the terminal-modified addition polymerized block copolymer has a branched or radial structure, it may have one to several numbers (so much as the number of branches) of hydroxyl groups on one end of the molecule. The number of the hydroxyl groups on the terminals per one molecule of the terminal-modified addition polymerized block copolymer is preferably from 0.5 to 1, more preferably, from 0.7 to 1.

The thermoplastic polyurethane elastomer (III) to be used in the thermoplastic polymer composition of the present invention is a thermoplastic polyurethane obtained through the reaction of high molecular diol, organic diisocyanate and a chain extender.

The high molecular diol to be used for the formation of the thermoplastic polyurethane elastomer (III) preferably has a number average molecular weight of from 1,000 to 6,000 since the mechanical property, heat resistance, and elastic properties at low temperature ranges of the thermoplastic polymer composition of the present invention are made satisfactory. In this case, the number average molecular weight of the high molecular diol described in the specification of the present invention is a number average molecular weight calculated based on the SITE-measured hydroxy value according to JIS K 1557.

Example of the high molecular diol to be used in the manufacture of the thermoplastic polyurethane elastomer (III) can include, for example, polyester diol, polyether diol, polyester ether diol, polycarbonate diol and polyester polycarbonate diol, and the thermoplastic polyurethane elastomer (III) can be formed by using one or more of such high molecular diols.

The polyester usable for the manufacture of the thermoplastic polyurethane elastomer can include, for example, a polyester diol obtained by the reaction of at least one dicarboxylic acid ingredient selected from aliphatic dicarboxylic acids, aromatic dicarboxylic acids and ester forming derivatives thereof with a low molecular diol and a polyester diol obtained by ring opening polymerization of lactone.

More specifically, the polyester diol described above can include, for example, a polyester diol obtained by polycondensation reaction of one or more of aliphatic dicarboxylic acids having from 6 to 10 carbon atoms such as glutaric acid, adipic acid, pimelic acid, suberic acid, azelaic acid, sebacic acid and dodecan diacid and aromatic dicarboxylic acid such as terephthalic acid, isophthalic acid, and orthophthalic acid and ester forming derivative thereof with one or more of aliphatic diol having from 2 to 10 carbon atoms such as ethylene glycol, propylene glycol, 1,4-butane diols, 1,5-pentane diol, 1,6-hexane diol, 1,9-nonane diol, 3-methyl-1, 5-pentane diol and 2-methyl-1,8-octane diol, polycaplolactone diol and polyvalerolactone diol.

The polyether diol which can be used for the manufacture of the thermoplastic polyurethane elastomer (III) can include, for example, polyethylene glycol, polypropylene glycol and polytetramethylene glycol.

The polycarbonate diol which can be used for the manufacture of the thermoplastic polyurethane elastomer (III) can include, for example, a polycarbonate diol obtained by the reaction of one or more of aliphatic diols such as 1,4-butane diol, 1,5-pentane diol, 1,6-hexane diol and 1,8-octane diol and a carbonate ester such as diphenyl carbonate and alkyl carbonate or phosgene.

The kind of the organic diisocyanate to be used for the manufacturing of the thermoplastic polyurethane elastomer (III) is not particularly limited, but one or more of aromatic diisocyanate, alicyclic diisocyanate and aliphatic diisocyanate having a molecular weight of 500 or less can be preferably used. The organic diisocyanate can include, for example, 4,4'-diphenylmethane diisocyanate, toluene diisocyanate, p-phenylene diisocyanate, xylylene diisocyanate, naphthalene diisocyanate, hydrogenated 4,4'-diphenylmethane diisocyanate (4,4'-dicyclohexylmethane diisocyanate), isophorone diisocyanate and hexamethylene diisocyanate, with 4,4'-diphenylmethane diisocyanate being preferably used among the organic diisocyanates described above.

The chain extending agent which can be used for the manufacture of the thermoplastic polyurethane elastomer (III) can include any of customary chain extending agents used for the manufacture of the thermoplastic polyurethane elastomers, and the kind is not particularly limited. Among them, one or more of aliphatic diols, alicyclic diols and aromatic diols are preferably used as the chain extending agent. The specific example of the chain extending agent preferably used can include, for example, diols such as ethylene glycol, diethylene glycol, 1,4-butane diol, 1,5-pentane diol, 2-methyl-1,3-propane diol, 1,6-hexane diol, neopentyl glycol, 1,9-nonanediol, cyclohexane diol and 1,4-bis($\beta$-hydroxyethoxy)benzene. Among them, aliphatic diols having from 2 to 6 carbon atoms are preferably used, and 1,4-butane diol is used more preferably.

In the thermoplastic polymer composition of the present invention, as the thermoplastic polyurethane elastomer (III), there can be used a thermoplastic polyurethane elastomer which is obtained by the reaction of a high molecular diol, a chain extending agent and an organic diisocyanate so as to be in the range of high molecular diol:chain extending agent=1:0.2 to 8.0 (molar ratio), and [the sum of the mol number of high molecular diol and the chain extending agent]:[mol number of organic diisocyanate]=1:0.98 to 1.04. The thermoplastic polymer composition of the present invention containing such thermoplastic polyurethane elastomer (III) is free from abrupt increase of viscosity upon melt-molding such as extrusion molding and injection molding, so that aimed products such as laminate structures can be manufactured smoothly, and the heat resistance of the products obtained therefrom is satisfactory.

The hardness (JIS A hardness: measured at 25° C.) of the thermoplastic polyurethane elastomer (III) is preferably from 55 to 90, since the molded products and laminate structures obtained from the thermoplastic polymer composition have satisfactory mechanical property and can provide appropriate hardness. If the hardness of the thermoplastic polyurethane elastomer (III) is less than 55, mechanical property of the molded products and laminate structures obtained from the thermoplastic polymer composition tend to be lowered. On the other hand, if the hardness of the thermoplastic polyurethane elastomer exceeds 90, the flexibility of the molded products and the laminate structures obtained from the thermoplastic polymer composition tend to be lowered.

In the thermoplastic polymer composition of the present invention, when a thermoplastic polyurethane having poly (3-methyl-1,5-pentane adipate)diol with a number average molecular weight of 2,000 or more as a soft segment is used as the thermoplastic polyurethane elastomer (III), namely, if a thermoplastic polyurethane elastomer obtained by reacting a polyester diol having a number average molecular weight of 2000 or more formed by polycondensation of adipic acid and 3-methyl-1,5-pentane diol with the above-mentioned chain extending agent and the organic diisocyanate is used, there can be obtained a thermoplastic polymer composition excellent in flexibility, elasticity, mechanical property, oil resistance, moldability and melt adhesion as described above and, especially, excellent in compression set and moldability.

The method of manufacturing the thermoplastic polyurethane elastomer (III) is not particularly limited, and it can be manufactured by any of a prepolymer method and a one shot method utilizing a known urethanizing reaction using the above-mentioned high molecular diol, organic diisocyanate and chain extending agent. Among them, the polyurethane elastomer is preferably manufactured by melt-polymerization substantially in the absence of solvent, especially, manufactured by continuous melt-polymerization by using a multi-screw extruder.

In the thermoplastic polymer composition of the present invention, a paraffin oil having dynamic viscosity at 40° C. of from 20 to 800 centistokes (cst), degree of fluidity from 0 to −40° C. and flash point of from 200 to 400° C. is preferably used and a paraffin oil having dynamic viscosity at 40° C. of from 50 to 600 cst, degree of fluidity from 0 to −30° C. and flash point of from 250 to 350° C. is more preferably used as the paraffin oil (IV).

Generally, an oil to be used as a process oil is a mixture of ingredients having aromatic rings such as a benzene ring and a naphthene ring and paraffin ingredients (linear hydrocarbon), and a process oil in which the number of carbon atoms constituting paraffin chains is 50% by weight or more of the total carbon atoms of the oil is referred to as a "paraffin oil".

As the paraffin oil (IV) used in the thermoplastic polymer composition of the present invention, any of those referred to as paraffin oils can be used, but those having a content of aromatic ring ingredients of 5% by weight or less are preferably used.

The thermoplastic polymer composition of the present invention comprises from 5 to 200 parts by weight of the polyurethane block copolymer (II), from 10 to 300 parts by weight of the thermoplastic polyurethane elastomer (III) and from 10 to 300 parts by weight of the paraffin oil (IV) based on 100 parts by weight of the addition polymerized block copolymer (I).

If the content of the polyurethane block copolymer (II) is less than 5 parts by weight based on 100 parts by weight of the addition polymerized copolymer (I), the compatibility between the addition polymerized block copolymer (I) and the thermoplastic polyurethane elastomer (III) is insufficient and it results in surface roughness and lowering of adhesion between layers in molded products and laminate structures obtained from the thermoplastic polymer composition.

On the other hand, if the content of the polyurethane block copolymer exceeds 200 parts by weight based on 100 parts by weight of the addition polymerized block copolymer (I), the melt flowability of the thermoplastic polymer composition is lowered, and this also results in surface roughness and lowering of adhesion between layers in molded products obtained from the thermoplastic polymer composition and laminate structures obtained from the products.

Particularly, it is preferred that the thermoplastic polymer composition of the present invention contains from 10 to 180 parts by weight, preferably, from 20 to 150 parts by weight of the polyurethane block copolymer (II) based on 100 parts by weight of the addition polymerized block copolymer.

If the ratio of the thermoplastic polyurethane elastomer (III) is less than 10 parts by weight based on 100 parts by weight of the addition polymerized block copolymer (I), it results in the increase of permanent deformation of molded products and laminate structures obtained from the thermoplastic polymer composition, lowering the melt-adhesion with other materials, rough surface of molded products and, in addition, unstable moldability. On the other hand, if the ratio of the thermoplastic polyurethane elastomer (III) exceeds 300 parts by weight based on 100 parts by weight of the addition polymerized block copolymer, it results in lowering the melt adhesion with other materials, rough surface and hardness increase of molded products.

The thermoplastic polymer composition of the present invention preferably contains from 50 to 250 parts by weight of the thermoplastic polyurethane elastomer (III) based on 100 parts by weight of the addition polymerized block copolymer (I).

If the ratio of the paraffin oil (IV) is less than 10 parts by weight based on 100 parts by weight of the addition polymerized block copolymer (I), it results in the increase of permanent deformation of molded products and laminate structures obtained from the thermoplastic polymer composition, rough surface and, in addition, hardness increase of molded products. On the other hand, if the ratio of the paraffin oil (IV) exceeds 300 parts by weight based on 100 parts by weight of the addition polymerized block copolymer (I), it results in problems such as lowering melt adhesion with other materials, lowering mechanical properties such as tensile strength and tensile elongation at break, rough surface of molded products and sprue breakage during injection molding. The thermoplastic polymer composition of the present invention preferably contains the paraffin oil (IV) at a ratio of from 50 to 250 parts by weight based on 100 parts by weight of the addition polymerized block copolymer (I).

The thermoplastic polymer composition may optionally contain other thermoplastic polymers such as olefin polymers, styrene resins, polyphenylene ether resins or polyethylene glycols.

Particularly, incorporation of an olefin polymer in the thermoplastic polymer composition of the present invention is preferred since the fabricability and mechanical strength of the thermoplastic polymer composition can be further improved. The olefin polymer can include, for example, one or more of block copolymers and random copolymers of polyethylene, polypropylene, polybutene resin or propylene with other α-olefins such as ethylene and 1-butene. Generally, the blending amount of the olefin polymer in the thermoplastic polymer composition is preferably 200 parts by weight or less based on 100 parts by weight of the addition polymerized block copolymer (I) to prevent deterioration of the flexibility of the thermoplastic polymer composition.

In addition, the thermoplastic polymer composition of the present invention can optionally contain inorganic fillers. The inorganic filler is useful for increasing the hardness of the thermoplastic polymer composition and has advantages from economical viewpoint. As the inorganic filler, one or more of calcium carbonate, talc, clay, synthetic silicon, titanium oxide, carbon black and barium sulfate can be used, for example. The blending amount of the inorganic filler is preferably used within the range of preventing the flexibility deterioration of the thermoplastic polymer composition and, generally, the blending amount is preferably 100 parts by weight or less based on 100 parts by weight of the addition polymerized block copolymer (I).

The thermoplastic polymer composition of the present invention may optionally contain, in addition to the above-mentioned ingredients, one or more of lubricants, lightstabilizers, pigments, flame retardants, antistatic agents, silicone oils, anti-blocking agents, UV absorbers, antioxidants, mold-releasing agents, foaming agent and perfumes.

The method of manufacturing the thermoplastic polymer composition is not particularly limited, and any method can be adapted so long as the method can homogeneously mix the above mentioned ingredients to be used in the thermoplastic polymer composition of the present invention, and a melt-kneading method is usually adopted. The melt-kneading can be conducted by using melt-kneading devices such as single screw extruders, twin screw extruders, kneaders, rollers or banbury mixers, and the thermoplastic polymer composition of the present invention can be obtained by conducting melt-kneading at the temperature range from 170 to 250° C. for about 30 sec to 5 min.

Since the thermoplastic polymer composition of the present invention is melt-processable, and excellent in moldability, various kinds of molded products can be manufactured by using it alone, in which various molded products excellent in flexibility, elasticity, mechanical property and oil resistance can be obtained. As the manufacturing method, there can be adopted various molding methods ordinarily used for thermoplastic polymers, that is an optional molding method such as injection molding, extrusion molding, press molding, blow molding, calendering and cast molding.

In addition, since the thermoplastic polymer composition of the present invention is extremely excellent in melt adhesion, and can be adhered strongly under melting with other various kinds of materials (for example, synthetic resins, rubbers, metal, wood, ceramics, paper and fabrics), it can be used especially effectively upon manufacture of laminate structures (composite structures) with other materials. Accordingly, the present invention includes laminate structures (composite structures) having the layer of the thermoplastic polymer composition of the present invention with layers of other materials within the range of the present invention.

The kind of other materials to which the thermoplastic polymer composition of the present invention is melt-adhered is not particularly limited. Since the thermoplastic polymer composition of the present invention is excellent particularly in melt adhesion to polar materials, the present invention includes laminate structures of the thermoplastic polymer composition with other materials having polarity as a preferred embodiment thereof.

The specific examples of other materials having polarity to be used for the laminate structures of the present invention can include, for example, various kinds of synthetic resins such as polyurethane, polyamide, polyester, polycarbonate, polyphenylene sulfide, polyacrylate, polymethacrylate, polyether, polysulfone, acrylonitrile/styrene copolymer (AS resin), styrene/maleic anhydride copolymer (SMA resin), rubber reinforced polystyrene (HIPS resin), acrylonitrile-butadiene-styrene copolymer (ABS resin), methyl methacrylate/styrene copolymer (MS resin), methyl methacrylate/butadiene/styrene copolymer (MBS resin), acrylonitrile/styrene/butadiene copolymer, vinyl chloride polymer, vinylidene chloride polymer, vinyl chloride/vinyl acetate copolymer, polyvinylidene fluoride phenol resin and epoxy resin; various synthetic rubbers such as isoprene rubber, butadiene rubber, butadiene-styrene rubber, butadiene-acrylonitrile rubber, chloroprene rubber, butyl rubber, urethane rubber, silicone rubber, fluororubber and acrylonitrile rubber; and metals such as iron, aluminum and copper and various alloys such as stainless steel, tin plate and galvanized steel. However, the other materials constituting the laminate structures of the present invention are not limited to those materials described above.

The number of layers, thickness of each layer, shape and structure of the laminate structure of the present invention are not particularly limited, but can be determined depending on the applications of the laminate structure.

The laminate structure of the present invention can include, for example, a laminate structure having one layer of the thermoplastic polymer composition and one layer of another material, a laminate structure having one layers of the thermoplastic polymer composition on both sides of another material, a laminate structure having one layer of the thermoplastic polymer composition between two other materials, and a laminate structure having at least one layer of the thermoplastic polymer composition and two or more layers of other materials identical with or different from each other.

When the laminate structure has two or more layers of other materials, other materials constituting respective layers may be the identical or different with each other. When the laminate structure has two or more layers of the thermoplastic polymer composition of the present invention, the thermoplastic polymer compositions constituting respective layers may be identical or different with each other.

The manufacturing method for the laminate structure of the present invention having a layer of the thermoplastic polymer composition and a layer of another material is not particularly limited, but any of methods of manufacturing a laminate structure by melt-adhesion can be adopted. Among them, the manufacturing method for the laminate structure of the present invention can include various kinds of melt processing, for example, injection molding such as insert injection molding, two-color injection molding, core back injection molding, sandwich injection molding, injection press-molding; extrusion molding such as T-die laminate molding, coextrusion molding and extrusion casting; blow molding; calendering; press molding and transfer molding.

Among the molding methods described above, when the insert injection molding is adopted to produce a laminate structure having a layer of the thermoplastic polymer composition of the present invention and a layer of another material, such kind of method is generally employed, namely inserting another material previously formed into a predetermined shape and size into a mold, to which the thermoplastic polymer composition of the present invention is injection molded. In this case, the method of forming another material to be inserted to the mold is not particularly limited. When another material to be inserted is a synthetic resin or a rubber product, it may be manufactured, for example, by any of injection molding, extrusion molding and cutting to a predetermined size, press molding and casting. In addition, when another material to be inserted is a metal material, it may be formed into a predetermined shape and size previously by a method used customarily for manufacturing metal products (casting, rolling, cutting, machining and grinding).

When the laminate structure is manufactured by the two-color injection molding method by using two or more injecting devices, such kind of method is usually adopted to manufacture a laminate structure, namely, injecting the first material into the first mold, exchanging mold cavities by rotation or transfer of molds, and then injecting the thermoplastic polymer composition of the present invention into the space which is formed between the second mold wall and the molded parts made of the first material formed by the first injection. When it is manufactured by the core back injection molding using one injection molding machine and one mold to form a molded product having the laminate structure, such kind of method is generally adopted, namely, injecting the first material into a mold, enlarging the cavity of the mold, and then injecting the thermoplastic polymer composition of the present invention.

In the injection-molding method described above, a laminate structure may be manufactured also by reversing the order of injecting the materials, namely, injecting at first the thermoplastic polymer composition of the present invention and then injecting the other material (thermoplastic resin and the like) to form a laminate structure.

To produce the laminate structure having at least one layer of the thermoplastic polymer composition of the present invention and at least one layer of other thermoplastic materials, melt extrusion can also be applied, melt extruding and bonding the thermoplastic polymer composition of the present invention and other thermoplastic materials simultaneously through a mold (die) divided into two or more layers of inner and outer layers, upper and lower layers or right and left layers. When the other material is not thermoplastic, the laminate structure can be manufactured by extrusion-coating the thermoplastic polymer composition of the present invention under melting above or at the periphery of the other material.

In addition, when conducting calendering, the aimed laminate structure can be manufactured by calendering the thermoplastic polymer composition of the present invention under melting on the other material in a molten-plasticized or solid state for coating and lamination. In addition, when conducting press-molding, the laminate structure can be manufactured by melt-pressing the thermoplastic polymer composition of the present invention while placing the other material.

The kind, shape, structure and application uses of the laminate structure of the present invention are not particularly limited, and the present invention includes any of laminate structures having a layer of the thermoplastic polymer composition of the present invention and a layer of other materials.

The laminate structure of the present invention can be used for various kinds of industrial products and parts with no particular restriction. Specific examples can include various products, for example, interior parts of automobiles and vehicles such as instrument panels, center panels, center console boxes, door trims, pillars, assist grips; exterior parts of automobiles such as chenilles; parts of household electric appliances such as bumpers of vacuum cleaners, remote control switches and knobs and various kinds of key tops of office automation equipments; products for underwater use such as underwater glasses and underwater camera covers; various kinds of cover parts; various industrial parts with packings aiming at sealing property, waterproofness, sound insulation and vibration damping; automobile functional parts such as rack & pinion boots, suspension boots, equi-velocity joint boots; electric and electronic parts such as coatings of curled cord electric wires, belts, hoses, tubes and soundless gears; sports articles; building materials such as doors and window frames; various kinds of joints; valve parts and medical gypsum.

Then, in the products in which the layer comprising the thermoplastic polymer composition of the present invention is present at least on one surface of the laminate structure, since the thermoplastic polymer composition is elastic and has flexibility, the products show soft and good feeling upon contact, have shock absorbing performance (cushioning property) and are excellent also in impact resistance, so that they are also excellent in view of safety.

EXAMPLES

The present invention will be explained more specifically with reference to examples and comparative examples but the present invention are not restricted at all to such examples. In the following examples and comparative examples, thermoplastic compositions (pellets) used for the manufacture of molding products and lamination structures were prepared as below. Further, molding products (test specimen) and laminate structures were manufactured as below by using the thus obtained thermoplastic polymer compositions (pellets) and their physical properties, namely, appearance, hardness, tensile strength at break, tensile elongation at break, 100% modulus and compression set of the molding products, as well as the peeling strength of the laminate structures were measured as described below.

(1) Preparation of Thermoplastic Polymer Compositions (Pellets)

Each of pellets of the thermoplastic polymer compositions was manufactured by preparing a mixture by blending polymer materials other than the paraffin oil among each of the materials used in the examples and the comparative examples described below and then adding and impregnating the paraffin oil to the blend, or by preparing a mixture with no addition of the paraffin oil (Comparative Examples 1 to 3, 7 and 8), melt kneading the mixture using a twin screw extruder ("BT-30" manufactured by Plastic Industry Institute) at a cylinder temperature of 220° C. and at the screw rotation speed of 150 rpm and then extruding the same into a strand, followed by cutting.

(2) Evaluation of the Appearance of the Molding Product

Each of the molding products (test specimens) (size: length×width×thickness=200 mm×200 mm×2 mm) was manufactured by using pellets of the thermoplastic polymer composition prepared in (1) above or using single polymer materials (Comparative Examples 1–3) and conducting injection molding using an injection molding machine (manufactured by Nissei Resin Industry Co. Ltd: the clamping force of 80 ton) under the cylinder temperature of 220° C. and the die temperature of 40° C., the appearance of the thus obtained molded product was visually observed and evaluated in accordance with the evaluation standards shown in the following Table 1.

TABLE 1

[Evaluation Standards for Moldability]

| | |
|---|---|
| ⊚ | molded product is smooth over the entire surface and show excellent moldability |
| o | molded product shows not smooth portion at a small area of the surface but is smooth substantially over the entire surface and shows good moldability |
| Δ | molded product suffers from flow marks for a considerable portion on the surface, has no smooth portion and shows poor moldability |
| x | molded product suffers from flow marks over the entire surface, is roughened for the entire surface and shows extremely poor moldability. |

TABLE 1-continued

[Evaluation Standards for Moldability]

(3) Measurement for Hardness

Using each of the molded products (test specimens) manufactured in (2) above and hardness was measured according to JIS K 6301 (method A).

(4) Measurement of Tensile Strength at Break, Tensile Elongation at Break and 100% Modulus No. 3 dumbbell test pieces were manufactured by using pellets of the thermoplastic polymer composition prepared in (1) above or using single polymer materials (Comparative Examples 1–3) and conducting injection molding using an injection molding machine (manufactured by Nissei Resin Industry Co. Ltd: the clamping force of 80 ton) under the conditions at the cylinder temperature of 220° C. and the die temperature of 40° C., and the tensile strength at break, tensile elongation at break and 100% modulus were measured using the dumbbell test specimens according to JIS K 6301.

(5) Measurement of Compression Set

Straight cylindrical molded products (test specimens) of which sizes are 29.0 cm in diameter and 12.7 mm thickness were manufactured by using pellets of the thermoplastic polymer composition prepared in (1) above or using single polymer materials (Comparative Examples 1–3) and conducting injection molding using an injection molding machine (manufactured by Nissei Resin Industry Co. Ltd: the clamping force of 80 ton) under the conditions at the cylinder temperature of 220° C. and the die temperature of 40° C., and compression distortion strain after leaving the test pieces under the conditions at the temperature of 70° C. and 25% compression distortion for 22 hours was measured in accordance with JIS K 6301 using the test specimens, to obtain permanent compression set.

(6) Measurement of Peel Strength in Laminate Structure (a) Synthetic resin plates (size: length×width×thickness=200 mm×150 mm×1 mm) or metal plates (size: length×width×thickness=200 mm×150 mm×0.2 mm) were previously arranged and placed each in a die into which injection molding was conducted by using the pellets of the thermoplastic polymer compositions prepared in (1) above or using single polymer materials (Comparative Examples 1–3), using an injection molding machine (manufactured by Nissei Resin Industry Co.; the clamping force of 80 ton under the conditions at the cylinder temperature of 220° C. and the die temperature of 40° C. to manufacture laminate structures each having a layer of the thermoplastic polymer composition or a thermoplastic elastic polymer (I) on one surface of a resin plate or the metal plate (size: length×width×thickness=200 mm×150 mm×2 mm).

(b) Test specimens for measuring the peel strength (size: length×width×thickness=80 mm×25 mm×2 mm) were cut out each from the laminate structure obtained in (a) above, and the peel strength was measured using the test specimen in accordance with "180° peeling test" as specified in JIS K 6854.

The thermoplastic elastic polymer (I), the polyurethane block copolymer (II), the thermoplastic polyurethane elastomer (III) and the paraffin oil (IV) used in the examples and comparative examples described below, as well as synthetic resins constituting the synthetic resin plates used for manufacturing the laminate structures in the examples and the comparative examples shown below have abbreviation and/or contents as described below.

[Thermoplastic Elastic Polymer (I)]

SEPS: hydrogenation product of a triblock copolymer comprising polystyrene block-polyisoprene block-polystyrene block (number average molecular weight: 200,000, styrene content=30% by weight, hydrogenation ratio in polyisoprene block=98%).

[Polyurethane Block Copolymer (II)]

PU/SEPS: diblock copolymer of a thermoplastic polyurethane (TPU 1180) and an addition polymerized block copolymer (SEPS) obtained by blending 100 parts by weight of a triblock copolymer hydrogenated product having a hydroxyl group on one terminal of a molecule comprising a polystyrene block-polyisoprene block-polystyrene block (SEPS-OH) (number average molecular weight: 200,000, styrene content=30% by weight, hydrogenation ratio in polyisoprene block=98% and average number of hydroxyl groups=0.9 N/molecule) and 100 parts by weight of the following thermoplastic polyurethane (TPU 1180), melt kneading and then extruding them by using a twin screw extruder ("BT-30" manufactured by Plastic Industry Institute) under the conditions at the cylinder temperature of 220° C. and at the screw rotation speed of 150 rpm, cutting into pellets, extracting to remove unreacted polyurethane from the thus obtained pellets by using dimethyl formamide, then extracting to remove unreacted SEPS-OH by using cyclohexane and drying the remaining solids.

[Thermoplastic Polyurethane Elatomer (III)]

TPU 1180: polyester polyurethane elastomer ["Kramilon U-1180" manufactured by Kuraray Co., Ltd.: polyester polyurethane elastomer having aliphatic polyester as a soft segment]

TPU 9180: polyether polyurethane elastomer ["Kramilon U-9180" manufactured by Kuraray Co., Ltd.: polyether polyurethane elastomer having polyethylene glycol as a soft segment].

TPU 8175: polyester polyurethane elastomer ["Kramilon U-8175" manufactured by Kuraray Co., Ltd.: polyester polyurethane elastomer having poly(3-methyl-1,5-pentane adipate as a soft segment].

[Paraffin Oil (IV)]

Paraffin oil: paraffin oil "PW-380" manufactured by Idemitsu Kosan Co., Ltd.)

[Synthetic Resin Constituting the Synthetic Resin Plate Used for the Manufacture of Laminate Structure]

PC: polycarbonate resin ("Panlite L-1225" manufactured by Teijin Kasei Co.)

ABS: acrylonitrile/butadiene/styrene copolymer resin ("Stylac 101" manufactured by Asahi Chemical Industry Co., Ltd.)

PA66: Nylon 66 resin ("Leona S 1300" manufactured by Asahi Chemical Industry Co., Ltd.)

PBT: polybutylene terephthalate resin (Houser KL 263F" manufactured by Kuraray Co., Ltd.)

[Examples 1–7]

(1) Pellets of thermoplastic polymer compositions were prepared by the method described above, by using SEPS [addition polymerized block copolymer (I)], PU/SEPS [polyurethane block polymer (II)], TPU 1180 or TPU 9180 [thermoplastic poyurethane elastomer (III)] and paraffin oil each at the ratio shown in the following table 2.

(2) Using the respective pellets obtained in (1) above, molded products (test specimens) and lamination structures were manufactured by the method described above. When the appearance of the thus obtained molding products were evaluated by the method described above, and the hardness, tensile strength at break, tensile elongation at break, 100% modulus and compression set of the molding products, as well as the peel strength of the laminate structures were measured by the method as described above, they were as shown in the following Table 2.

[Examples 8–14]

(1) Pellets of thermoplastic polymer compositions were prepared by the method described above, by using SEPS [addition polymerized block copolymer (I)], PU/SEPS [polyurethane block polymer (II)], TPU 8175 [thermoplastic polyurethane elastomer (III)] and paraffin oil each at the ratio shown in the following Table 3.

(2) Using the respective pellets obtained in (1) above, molded products (test specimens) and lamination structures were manufactured by the method described above. When the appearance of the thus obtained molding products were evaluated by the method described above, and the hardness, tensile strength at break, tensile elongation at break, 100% modulus and compression set of the molding products, as well as the peel strength of the laminate structures were measured by the method as described above, they were as shown in the following Table 3.

[Comparative Examples 1–3]

Molded products (test specimens) and laminate structures were manufactured by the method described above using TPU 1180, TPU 9180 or TPU 8175 (each being thermoplastic polyurethane elastomer (III)] and when the appearance of the thus obtained molded products was evaluated by the method described above, and the hardness, tensile strength at break, tensile elongation at break, 100% modulus and compression set of the molded products, as well as the peel strength of the laminate structure were measured as described above, they were as shown in the following Table 4.

[Comparative Examples 4 and 5]

Molded products (test specimens) and laminate structures were manufactured by the method described above by using TPU 1180 [thermoplastic polyurethane elastomer (III)] and paraffin oil each at a ratio shown in the following Table 4 based on 100 parts by weight of SEPS [addition polymerized block copolymer] and when the appearance of the thus obtained molded products was evaluated by the method described above, and the hardness, tensile strength at break, tensile elongation at break, 100% modulus and compression set of the molded products, and the peel strength of the laminate structures were measured by the method described above, they were as shown in the following Table 4.

[Comparative Examples 6 to 8]

Molded products (test specimens) and laminate structures were manufactured by the method described above by using PU/SEPS [polyurethane block copolymer (II)] together with paraffin oil, TPU 1180 or TPU 8175 [thermoplastic polyurethane elastomer (III)] shown in Table 5 based on 100 parts by weight of SEPS [addition polymerized block copolymer] and when the appearance of the thus obtained molding products was evaluated by the method described above, and the hardness, tensile strength at break, tensile elongation at break, 100% modulus and compression set of the molded products, and the peel strength of the laminate structures were measured by the method described above, they were as shown in the following Table 5.

[Comparative Examples 9 to 11]

Molded products (test specimens) and laminate structures were manufactured by the method described above by using PU/SEPS [polyurethane block copolymer (II)] together TPU 1180 or TPU 8175 [thermoplastic polyurethane elastomer (III)], and paraffin oil shown in Table 5 based on 100 parts by weight of SEPS [addition polymerized block copolymer] and when the appearance of the thus obtained molded products was evaluated by the method described above, and the hardness, tensile strength at break, tensile elongation at break, 100% modulus and compression set of the molded products, and the peel strength of the laminate structures were measured by the method described above, they were as shown in the following Table 5.

TABLE 2

|  | Example | | | | | | |
|---|---|---|---|---|---|---|---|
|  | 1 | 2 | 3 | 4 | 5 | 6 | 7 |
| [Blend(parts by weight)] | | | | | | | |
| SEPS | 100 | 100 | 100 | 100 | 100 | 100 | 100 |
| PU/SEPS Polyurethane elastomer | 50 | 50 | 50 | 50 | 50 | 50 | 50 |
| TPU 1180 | 50 | 100 | 200 | 100 | 200 | | |
| TPU 9180 | | | | | | 100 | 200 |
| TPU 8175 | | | | | | | |
| Paraffin oil | 100 | 100 | 100 | 200 | 200 | 100 | 100 |
| [Property of molding product] | | | | | | | |
| Appearance of molding product | ◎ | ◎ | ◎ | ◎ | ◎ | ◎ | ◎ |
| Hardness (JIS A hardness) | 41 | 45 | 52 | 28 | 35 | 45 | 50 |
| Tensile strength at break (Mpa) | 5.9 | 6.2 | 6.5 | 2.8 | 3 | 5.9 | 6.5 |
| Tensile elongation at break (%) | 600 | 620 | 600 | 590 | 510 | 630 | 660 |
| 100% modulus (%) | 1.4 | 1.5 | 1.7 | 0.6 | 0.8 | 1.5 | 1.7 |
| Compression set (%) | 70 | 69 | 65 | 64 | 57 | 67 | 66 |
| [Peel strength of laminate structure] Synthetic resin plates | | | | | | | |
| PC plate (kg/25 mm) | 37 | 4.5 | 6.5 | 4.4 | 6 | 5 | 6.5 |
| ABS plate (kg/25 mm) | 3.5 | 4 | 5.5 | 3.9 | 5.2 | 4.1 | 6.1 |
| PA66 plate (kg/25 mm) | 2 | 2.4 | 5 | 2.5 | 4.3 | 2.4 | 5.4 |
| PBT plate (kg/25 mm) | 2.2 | 2.7 | 4 | 2 | 3.5 | 2.3 | 4.8 |
| Metal plate material | | | | | | | |
| Aluminum plate (kg/25 mm) | 10.6 | 12.5 | 16.3 | 11.3 | 15.1 | 11.7 | 18.6 |

TABLE 3

|  | Example | | | | | | |
|---|---|---|---|---|---|---|---|
|  | 8 | 9 | 10 | 11 | 12 | 13 | 14 |
| [Blend(parts by weight)] | | | | | | | |
| SEPS | 100 | 100 | 100 | 100 | 100 | 100 | 100 |
| PU/SEPS Polyurethane elastomer | 50 | 50 | 50 | 50 | 50 | 50 | 50 |
| TPU 1180 | | | | | | | |
| TPU 9180 | | | | | | | |
| TPU 8175 | 50 | 100 | 200 | 100 | 200 | 200 | 300 |
| Paraffin oil | 100 | 100 | 100 | 200 | 200 | 300 | 200 |
| [Property of molding product] | | | | | | | |
| Appearance of molding product | ◎ | ◎ | ◎ | ◎ | ◎ | ○ | ◎ |
| Hardness (JIS A hardness) | 43 | 46 | 51 | 31 | 38 | 29 | 42 |
| Tensile strength at break (Mpa) | 5.8 | 5.8 | 6.1 | 3.1 | 3.4 | 1.8 | 4.6 |
| Tensile elongation at break (%) | 630 | 610 | 580 | 600 | 500 | 410 | 590 |
| 100% modulus (%) | 1.3 | 1.6 | 1.6 | 0.7 | 0.9 | 0.6 | 1.3 |
| Compression set (%) | 66 | 60 | 52 | 57 | 50 | 47 | 54 |
| [Peel strength of laminate structure] Synthetic resin plates | | | | | | | |
| PC plate (kg/2S mm) | 3.8 | 5.2 | 6.8 | 4.5 | 6 | 5.3 | 5.6 |
| ABS plate (kg/25 mm) | 3 | 4.5 | 6.2 | 4.2 | 5.4 | 4.4 | 5.4 |
| PA66 plate (kg/25 mm) | 2.5 | 2.7 | 4.6 | 2.9 | 4.4 | 2 | 3.7 |
| PBT plate (kg/25 mm) | 2.4 | 2.9 | 4.4 | 3 | 3.7 | 2.5 | 3.6 |
| Metal plate material | | | | | | | |
| Aluminum plate (kg/25 mm) | 8.6 | 13.8 | 18.4 | 12.7 | 15.8 | 12.6 | 15.9 |

TABLE 4

|  | Comparative example | | | | |
|---|---|---|---|---|---|
|  | 1 | 2 | 3 | 4 | 5 |
| [Blend(parts by weight)] | | | | | |
| SEPS | | | | 100 | 100 |
| PU/SEPS Polyurethane elastomer | | | | | |
| TPU 1180 | 100 | | | 100 | 200 |
| TPU 9180 | | 100 | | | |
| TPU 8175 | | | 100 | | |
| Paraffin oil | | | | 100 | 100 |
| [Property of molding product] | | | | | |
| Appearance of molding product | ◎ | ◎ | ◎ | x | x |
| Hardness (JIS A hardness) | 80 | 80 | 75 | 42 | 47 |
| Tensile strength at break (Mpa) | 41 | 33 | 42 | 3.5 | 3.6 |
| Tensile elongation at break (%) | 600 | 640 | 700 | 450 | 350 |
| 100% modulus (%) | 4 | 4 | 4 | 1.6 | 1.6 |
| Compression set (%) | 60 | 55 | 32 | 75 | 75 |
| [Peel strength of laminate structure] | | | | | |

TABLE 4-continued

|  | Comparative example | | | | |
|---|---|---|---|---|---|
|  | 1 | 2 | 3 | 4 | 5 |
| Synthetic resin plates | | | | | |
| PC plate (kg/25 mm) | 8.7 | 8.0 | 8.6 | 1.3 | 1.3 |
| ABS plate (kg/25 mm) | 1.3 | 1.2 | 2 | 0.6 | 0.6 |
| PA66 plate (kg/25 mm) | 1 | 1.1 | 1.1 | 0.3 | 0.3 |
| PBT plate (kg/25 mm) | 1 | 10 | 1.2 | 0.4 | 0.4 |
| Metal plate material | | | | | |
| Aluminum plate (kg/25 mm) | 3.6 | 4.1 | 5.8 | 1.2 | 1.7 |

TABLE 5

|  | Comparative example | | | | | |
|---|---|---|---|---|---|---|
|  | 6 | 7 | 8 | 9 | 10 | 11 |
| [Blend(parts by weight)] | | | | | | |
| SEPS | 100 | 100 | 100 | 100 | 100 | 100 |
| PU/SEPS | 100 | 50 | 50 | 50 | 50 | 50 |
| Polyurethane elastomer | | | | | | |
| TPU 1180 |  | 100 |  | 100 | 350 |  |
| TPU 9180 | | | | | | |
| TPU 8175 |  |  | 100 |  |  | 200 |
| Paraffin oil | 100 |  |  | 350 | 100 | 400 |
| [Property of molding product] | | | | | | |
| Appearance of molding product | Δ | x | x | x | x | x |
| Hardness (JIS A hardness) | 36 | 75 | 70 | 22 | 60 | 25 |
| Tensile strength at break (Mpa) | 3.4 | 8.9 | 9.1 | 1.8 | 5.8 | 1.3 |
| Tensile elongation at break (%) | 650 | 500 | 540 | 350 | 500 | 340 |
| 100% modulus (%) | 1.3 | 3.3 | 3.4 | 0.4 | 2 | 0.4 |
| Compression set (%) | 71 | 80 | 75 | 48 | 62 | 44 |
| [Peel strength of laminate structure] | | | | | | |
| Synthetic resin plates | | | | | | |
| PC plate (kg/25 mm) | 0.7 | 2.4 | 2.9 | 1 | 6.6 | 0.4 |
| ABS plate (kg/25 mm) | 0.5 | 1.3 | 1.7 | 0.4 | 2 | 0.3 |
| PA66 plate (kg/25 mm) | 0.3 | 0.2 | 0.3 | 0.2 | 0.5 | 0.3 |
| PBT plate (kg/25 mm) | 0.4 | 0.3 | 0.2 | 0.3 | 0.5 | 0.3 |
| Metal plate material | | | | | | |
| Aluminum plate (kg/25 mm) | 1.0 | 3.3 | 5.4 | 1.8 | 6.3 | 0.8 |

From the results of Table 2 and Table 3 above, it can be seen that molded products with high quality can be obtained smoothly, which have smooth surface entirely with no roughness and have good balance of mechanical properties such as hardness, tensile strength at break, tensile elongation at break, 100% modulus, and compression set, namely, which are excellent in various properties such as appearance, mechanical properties, flexibility and elasticity, using thermoplastic polymer compositions of Examples 1–14 each containing 5 to 200 parts by weight of the polyurethane block copolymer (II)(PU/SEPS), from 10 to 300 parts by weight of the thermoplastic polyurethane elastomer (III) (TPU 1180, TPU 9180 and TPU 8175) and from 10 to 300 parts by weight of the paraffin oil (IV) based on 100 parts by weight of the addition polymerized copolymer (I) (SEPS).

Further, it can been seen from the results of Table 2 and Table 3 above that the thermoplastic polymer compositions of Examples 1 to 14 have high melt adhesion property with various materials such as synthetic resins or metals, the laminate structures comprising a layer made of various kinds of materials and the thermoplastic polymer composition of the present invention can be manufactured simply and smoothly without using adhesives, for example, by melt molding such as insert injection molding and that the thus obtained laminate structures have high peel strength and cause no delamination.

Then, it can be seen from the results of Examples 8 to 14 described in Table 3 above that thermoplastic polymer compositions and molded products further excellent in the moldability and the permanent compression set, among the various properties described above, can be obtained by using the poly(3-methyl-1,5-pentane adipate) polyurethane elastomer as the thermoplastic polyurethane elastomer (III) in the thermoplastic polymer compositions of the present invention.

On the other hand, it can been from the results of Comparative Examples 1 to 8 in Table 4 and Table 5 above that the polymers or the thermoplastic polymer compositions of Comparative Examples 1 to 8 not containing the four ingredients of the addition polymerized block copolymer (I), polyurethane block copolymer (II), thermoplastic polyurethane elastomer (III) and paraffin oil (IV) simultaneously but lacking in one or more of the four components are poor in one or more of properties among the appearance, hardness, tensile strength at break, tensile elongation at break, 100% modulus and compression set of the molded products obtained therefrom and have no various properties such as the moldability, appearance, mechanical property, flexibility and elasticity in good balance.

In addition, it can be seen from the results of Comparative Examples 1 to 8 in Table 4 and Table 5 that the polymers or the thermoplastic polymer compositions of the Comparative Examples 1 to 8 have no high melt adhesion property with various materials and show the melt adhesion property only to extremely limited kinds of materials, or show no melt adhesion property to most of materials.

Further, it can be seen from the results of Comparatives 9 to 11 in Table 5 that the thermoplastic polymer compositions of Comparative Examples 9 to 11 containing the four components of the addition polymerized block copolymer (I), polyurethane block copolymer (II), thermoplastic polyurethane elastomer (III) and paraffin oil (IV) simultaneously but with the ratio of the components being out of the range of the present invention, show remarkable roughness on the surface and are significantly poor in the appearance for the molded products obtained therefrom and have no various properties such as hardness, tensile strength at break, tensile elongation at break, 100% modulus and compression set in good balance.

In addition, the thermoplastic polymer compositions of Comparative Examples 9 to 11 have no high melt adhesion property with various materials, show melt adhesion property only to extremely limited kinds of materials or show no melt adhesion property to most of the materials.

As apparent from the foregoing explanations, since the thermoplastic polymer compositions according to the present invention have satisfactory elasticity, flexibility, mechanical property, oil resistance and moldability and, in addition, are excellent in melt adhesion property and adhere strongly under melting with various kinds of materials, laminate structures or composite materials having the layer of the thermoplastic polymer composition of the present invention and a layer comprising another material can be manufactured simply and smoothly by melting molding or other melt adhesion technique.

And the laminate structures (composition materials) which possess a layer comprising the thermoplastic polymer composition of the present invention at least in a part of the surface have flexible and elastic good feeling and are excellent also in view of safety due to their impact absorbing function and cushioning effect, since the thermoplastic polymer composition according to the present invention is excellent in the elasticity and flexibility.

Further, the thermoplastic polymer composition according to the present invention can be used effectively also to the manufacture of various molded products even by using the thermoplastic polymer composition alone while taking advantages of the excellent characteristics such as elasticity, soft and flexibility, mechanical property and oil resistance and good moldability.

Therefore, the molded product comprising the thermoplastic polymer composition according to the present invention and the laminate structure of the present invention having a layer of the thermoplastic polymer composition according to the present invention and layers comprising other materials can be used effectively, while taking advantages of foregoing excellent properties, to wide range of applications, for example, various kinds of interior parts used for automobiles or vehicles such as instrument panels, center panels, center console boxes, door trims, pillars and assist grips; automobile exterior parts such as chenilles; household parts such as bumpers, remote control switches or knobs of vacuum cleaners and various kinds of key tops of office automation equipments; products for underwater use such as underwater glasses or underwater camera covers; various kinds of cover parts, various industrial parts with packings aimed at sealing property, waterproofness, sound insulation and vibration damping; automobile function parts such as rack & pinion boots, suspension boots, equi-velocity joint boots; electric and electronic parts such as curled cord electric wire covers, belts, hoses, tubes and soundness gears; sports goods; building materials such as doors and window frames; various kinds of joints; valve parts and medical gypsum.

What is claimed is:

1. A thermoplastic polymer composition comprising:

(1) 100 parts by weight of at least one addition polymerized block copolymer (I) selected from a block copolymer having a polymer block (A1) mainly composed of an aromatic vinyl compound and a polymer block mainly composed of a conjugated diene compound, and a hydrogenation product thereof (B1) and, based thereon;

(2) 5 to 200 parts by weight of a polyurethane block copolymer (II) having an addition polymerized block (C) comprising a block copolymer having a polymer block (A2) mainly composed of an aromatic vinyl compound and a polymer block mainly composed of a conjugated diene compound, or a hydrogenation product thereof (B2), and a thermoplastic polyurethane elastomer block (D), wherein said thermoplastic polyurethane elastomer block D has a number average molecular weight of from 200 to 150,000;

(3) 10 to 300 parts by weight of a thermoplastic polyurethane elastomer (III); and (4) 10 to 300 parts by weight of a paraffin oil (IV).

2. A thermoplastic polymer composition according to claim 1, wherein the conjugated diene polymer blocks (B1) and/or (B2) are a polyisoprene block, a isoprene/butadiene copolymer block or hydrogenated block thereof.

3. A thermoplastic polymer composition according to claim 1, wherein the thermoplastic polyurethane elastomer (III) is a thermoplastic polyurethane obtained by the reaction of a diol having a number average molecular weight of from 1,000 to 6,000, an organic diisocyanate and a chain extender.

4. A laminate structure having a layer or layers comprising the thermoplastic polymer composition as defined in claim 1 and a layer or layers comprising other material.

5. A laminate structure as defined in claim 4, wherein the other material is at least one material selected from synthetic resins and metals.

6. A method of manufacturing a laminate structure as defined in claim 4, wherein the thermoplastic polymer composition defined in claim 1 is lamination molded under melting to other material.

* * * * *